United States Patent [19]

Stillwell

[11] 4,361,817
[45] Nov. 30, 1982

[54] BI-PHASE MODULATOR/DEMODULATOR

[75] Inventor: Harry F. Stillwell, Minnetonka, Minn.

[73] Assignee: Honeywell Inc., Minneapolis, Minn.

[21] Appl. No.: 200,795

[22] Filed: Oct. 27, 1980

[51] Int. Cl.³ .................. H04L 27/20; H04L 27/22
[52] U.S. Cl. ........................ 332/9 T; 329/102; 329/103; 329/105; 332/16 T; 375/55; 375/87
[58] Field of Search ............. 329/50, 102, 103, 105; 332/9 R, 9 T, 16 R, 16 T; 375/52, 55, 67, 87

[56] References Cited

U.S. PATENT DOCUMENTS 3,483,488 12/1969 Crosby .......................... 329/103 X
4,122,300 10/1978 Busigny et al. .................. 375/55 X
4,176,328 11/1979 Brown et al. ...................... 332/16 T Primary Examiner—Siegfried H. Grimm
Attorney, Agent, or Firm—Albin Medved

[57] ABSTRACT

A bi-phase modulator/demodulator circuit for converting uni-polar to bi-polar signals. The circuit can be used to bi-phase modulate a continuous wave (CW) input signal or to demodulate a bi-phase coded input signal by use of transistor-transistor logic (TTL) control signals. A tri-state logic gate is used to convert two digital signals to an unbiased AC signal which is applied to one of two inputs of a double balanced mixer. The other input of the mixer is adapted to receive a continuous wave signal for bi-phase modulation, or a bi-phase coded signal for demodulation.

2 Claims, 2 Drawing Figures

BI-PHASE MODULATOR/DEMODULATOR

The Government has rights in this invention pursuant to Contract No. F33615-77-C-1251 awarded by the Department of the Air Force.

SUMMARY OF THE INVENTION

The present invention relates to a bi-phase modulator/demodulator circuit for converting uni-polar to bi-polar signals. The circuit can be used to bi-phase modulate a continuous wave (CW) input signal or to demodulate a bi-phase coded input signal by use of transistor-transistor logic (TTL) control signals. A tri-state logic gate is used to convert two digital signals to an unbiased AC signal which is applied to one of two inputs of a double balanced mixer. The other input of the mixer is adapted to receive a continuous wave signal for bi-phase modulation, or a bi-phase coded signal for demodulation.

The present invention may be particularly useful in the apparatus of co-pending patent application Ser. No. 144,120, filed on Apr. 28, 1980, in the name of Baard H. Thue, and now U.S. Pat. No. 4,328,495. In the apparatus of FIG. 1 of said co-pending patent application, the present invention could perform the functions of ON/OFF switch 12 and decode switch 32.

DESCRIPTION OF THE PREFERRED EMBODIMENT

Figure 1:
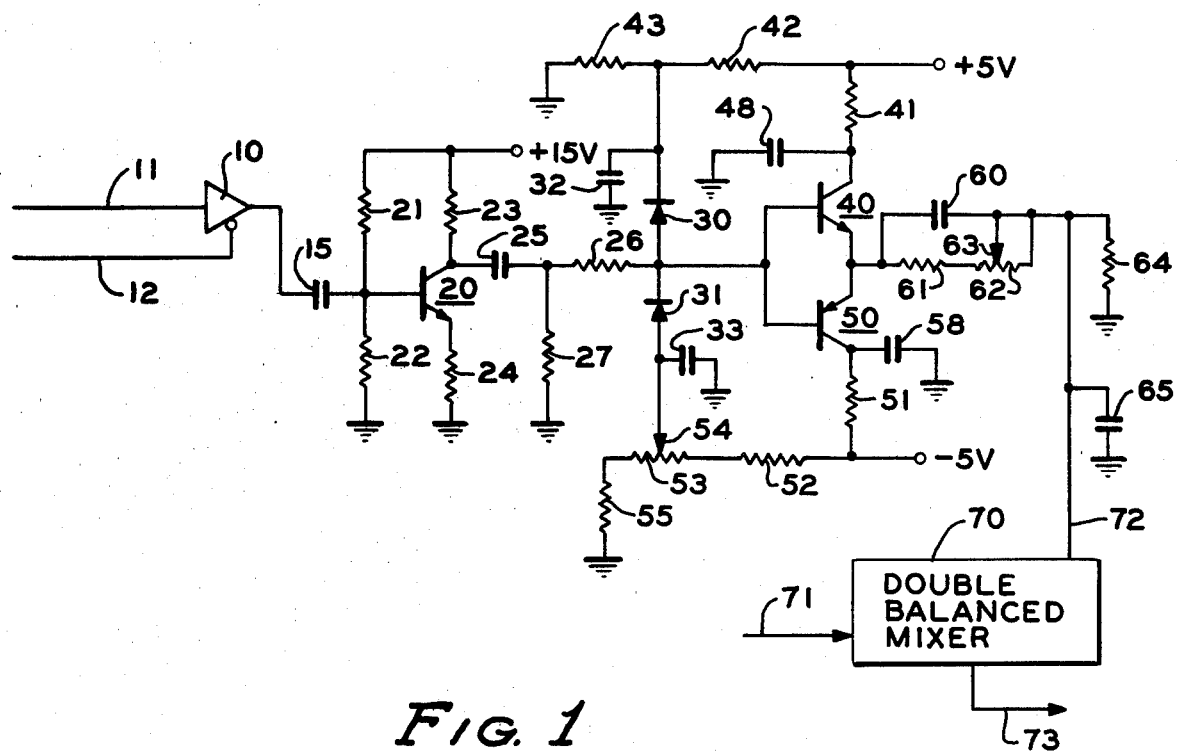
FIG. 1 of the drawings illustrates the preferred embodiment of the present invention.

Referring now to FIG. 1, a tri-state logic gate 10 is shown having a data input 11 and an enable input 12, and having an output. Tri-state logic gate 10 can be a tri-state inverter of the type manufactured by Texas Instruments and identified by SN54125.

The output of tri-state logic gate 10 is connected to the base of a transistor 20 through a capacitor 15. The function of capacitor 15 is to provide DC isolation. The base of transistor 20 is further connected to a source of positive potential through a resistor 21 and to a ground potential terminal through a resistor 22. Transistor 20 further has an emitter connected to a ground potential terminal through a resistor 24 and a collector connected to the source of positive potential through a resistor 23. Transistor 20 is biased by resistors 21, 22, 23, and 24, for class A operation and serves as the first amplifier stage. The bias resistors and the voltage is selected in the preferred embodiment such that the voltage signal at the collector of transistor 20 can swing linearly between approximately +3 to +15 volts.

The collector of transistor 20 is connected through a series of paths comprised of a capacitor 25 and a resistor 27 to the ground potential terminal, while the junction between capacitor 25 and resistor 27 is connected to the common base junction of transistors 40 and 50 through a resistor 26. The function of capacitor 25 and resistor 27 is to reference the swing of the signal which is applied to the base electrodes of transistors 40 and 50 about ground potential.

Transistors 40 and 50 are complementary transistors connected to receive an input signal at a common junction joining their respective base electrodes. Together with the associated bias network, transistors 40 and 50 comprise the second amplifier stage, providing an output at the common junction joining their respective emitter electrodes. The collector of transistor 40 is connected through a resistor 41 to a source of positive potential, while the collector of transistor 50 is connected, through a resistor 51, to a source of negative potential. The collector of transistor 40 is further connected to a ground terminal through a capacitor 48 and the collector of transistor 50 is connected to the ground terminal through a capacitor 58. A diode 30 is connected for forward current flow between the base electrodes of transistors 40 and 50 and a common junction between resistors 42 and 43. Resistors 42 and 43 form a voltage divider between the source of positive potential and the ground terminal and provide a fixed reference voltage for diode 30. A second diode 31 is connected between the base electrodes of transistors 40 and 50 and a wiper arm 54 of a variable resistor 53, which is, in turn, connected in series between resistors 52 and 55 to form a voltage divider network between a source of negative potential and a ground potential terminal. Resistors 52, 53, and 55 are selected such that the center of resistor 53 provides a voltage equal to but of opposite polarity to the voltage at the junction of resistors 42 and 43. Capacitors 32 and 33 provide the required AC bypassing for the voltages supplied to diodes 30 and 31, respectively.

A capacitor 48 is connected between the collector of transistor 40 and ground potential terminal and a capacitor 58 is connected between the collector of transistor 50 and the ground potential terminal. Resistors 41 and 51 and capacitors 48 and 58 provide decoupling and current limiting in the manner well known in the art.

The output of transistors 40 and 50 taken at the common junction of the emitters is applied, through a series path comprised of resistors 61 and 62 in parallel with a capacitor 60, to input 72 of a double balanced mixer 70. Resistor 62 is variable to permit the selection of an optimum current level for the mixer. A resistor 64 is connected between input 72 of mixer 70 and the ground to provide a return for the mixer when neither transistors 40 or 50 are conducting. A capacitor 65 connected between input 72 of mixer 70 and ground potential terminal and capacitor 60, connected in parallel with resistors 61 and 62, optimize the coded signal wave shape supplied to mixer 70 at input 72.

Double balanced mixer 70 may be of the SRA-3H type manufactured by Mini-Circuits. Mixer 70 further has a second input 71 for receiving a continuous wave (CW) input signal which is to be modulated by the signal appearing at input 72, or a coded input signal which is to be demodulated by the signal appearing at input 72. The resulting modulated or demodulated signal appears at output 73.

Figure 2:
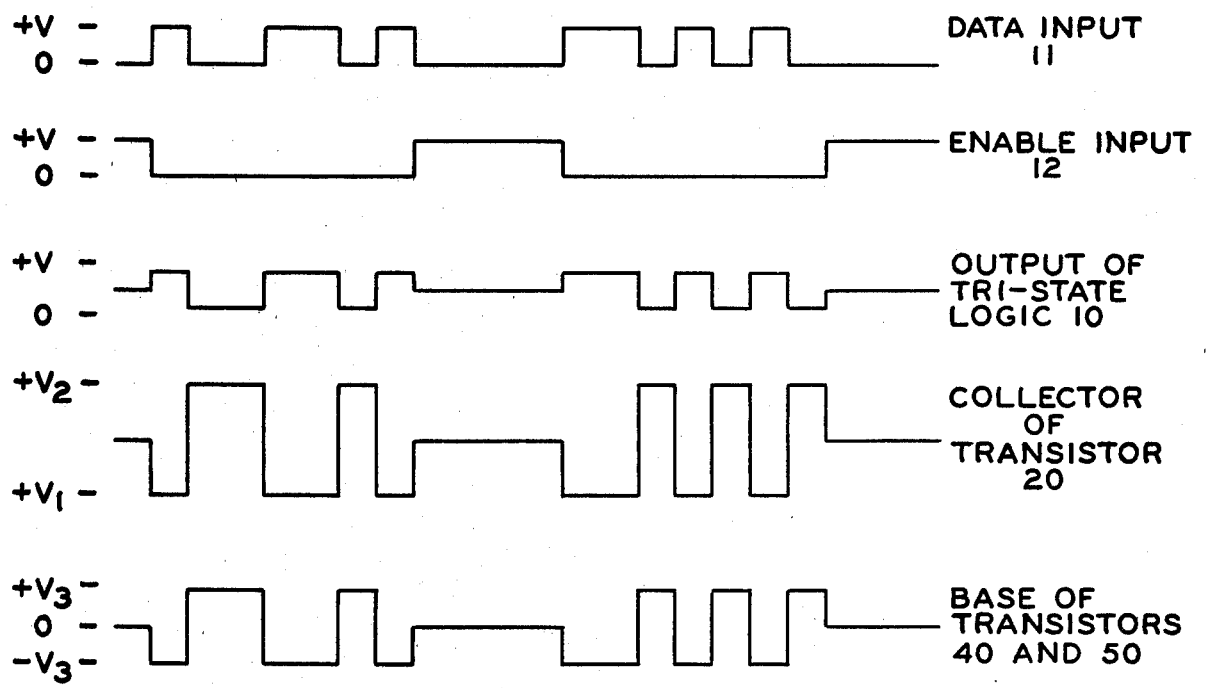
FIG. 2 illustrates typical signals appearing at various points in the circuit of FIG. 1.

FIG. 2 illustrates typical signals appearing at various points in the circuit of FIG. 1. The signals appearing at inputs 11 and 12 of tri-state logic gate 10 are uni-polar signals of the type shown in the top two wave forms of FIG. 2. Both of these signals are shown to swing between zero voltage and some positive value which is typically +5 volts. The signal at the output of tri-state logic gate 10 (shown in the third waveform of FIG. 2) swings between ground and typically +5 volts. When logic gate 10 is not enabled, the output is an open circuit.

The signal from the output of logic gate 10 is applied to the base electrode of transistor 20 and results in an amplified signal appearing at the collector of transistor 20. This amplified signal swings between first and second positive voltage levels, which in the preferred embodiment were selected to be between +3 and +15 volts, as shown in the fourth waveform of FIG. 2.

The signal from the collector of transistor 20 is then applied to the base electrodes of transistors 40 and 50 through the series path of capacitor 25 and resistor 26. Through the action of capacitor 25 and resistor 27, the signal applied to the base electrodes of transistors 40 and 50 is referenced to swing about the ground potential. Resistor 26 provides the necessary resistance against which clamp diodes 30 and 31 can operate. Resistors 42 and 43 provide a fixed reference voltage for diode 30 and establish the maximum positive voltage available at the emitters of transistors 40 and 50. Similarly, resistors 52, 53, and 55 provide a fixed reference voltage for diode 31 and establish the maximum negative voltage available at the emitters of transistors 40 and 50. The output signal appearing at the common emitter junction of transistors 40 and 50 is illustrated in the lower curve of FIG. 2. It can be seen that the signal appearing at the common emitter junction of transistors 40 and 50 is a bi-polar signal corresponding to the uni-polar signal appearing at input 11 of tri-state logic gate 10.

A preferred embodiment of the present invention has been described in the foregoing specification. Various modifications of the inventive concept will be obvious to those skilled in the art, without departing from the spirit of the invention. It is intended that the scope of the invention be limited only by the following claims:

What is claimed is:

1. A bi-phase modulator-demodulator circuit for converting uni-polar to bi-polar signals, comprising:
    a tri-state logic gate having first and second inputs for receiving first and second digital signals and having an output;
    a first amplifier stage including a first transistor having a base electrode connected to receive the signal from the output of said tri-state logic gate and having an emitter electrode and a collector electrode;
    impedance means for interconnecting said electrodes of said first transistor between sources of first and second potential so as to allow the signal at the collector electrode to swing linearly by a predetermined voltage amount in either direction from a reference potential;
    means for providing DC isolation between the output of said tri-state logic gate and the base electrode of said first transistor
    a second amplifier stage including second and third complementary transistors connected to receive an input signal at a common junction joining their respective base electrodes, and to provide an output at a common junction joining their respective emitter electrodes, and further having their collectors respectively connected to sources of positive and negative potential;
    means for providing DC isolation between the output of said first amplifier stage and the input of said second amplifier stage;
    means for limiting the voltage swing at the output of said second amplifier stage between predetermined positive and negative voltage levels; and
    a double balanced mixer having a first input connected to receive the signal from the output of said second amplifier stage and having a second input and an output.

2. Apparatus according to claim 1, wherein said means for limiting the voltage swing at the output of said second amplifier stage includes:
    a first diode connected between the common base junction of said second and third transistors and via a first voltage divider to said source of positive potential; and
    a second diode connected between the common base junction of said second and third transistors and via a second voltage divider to said source of negative potential;
    whereby said first and second diodes further provide desirable temperature compensation.

* * * * *